Figure 3:
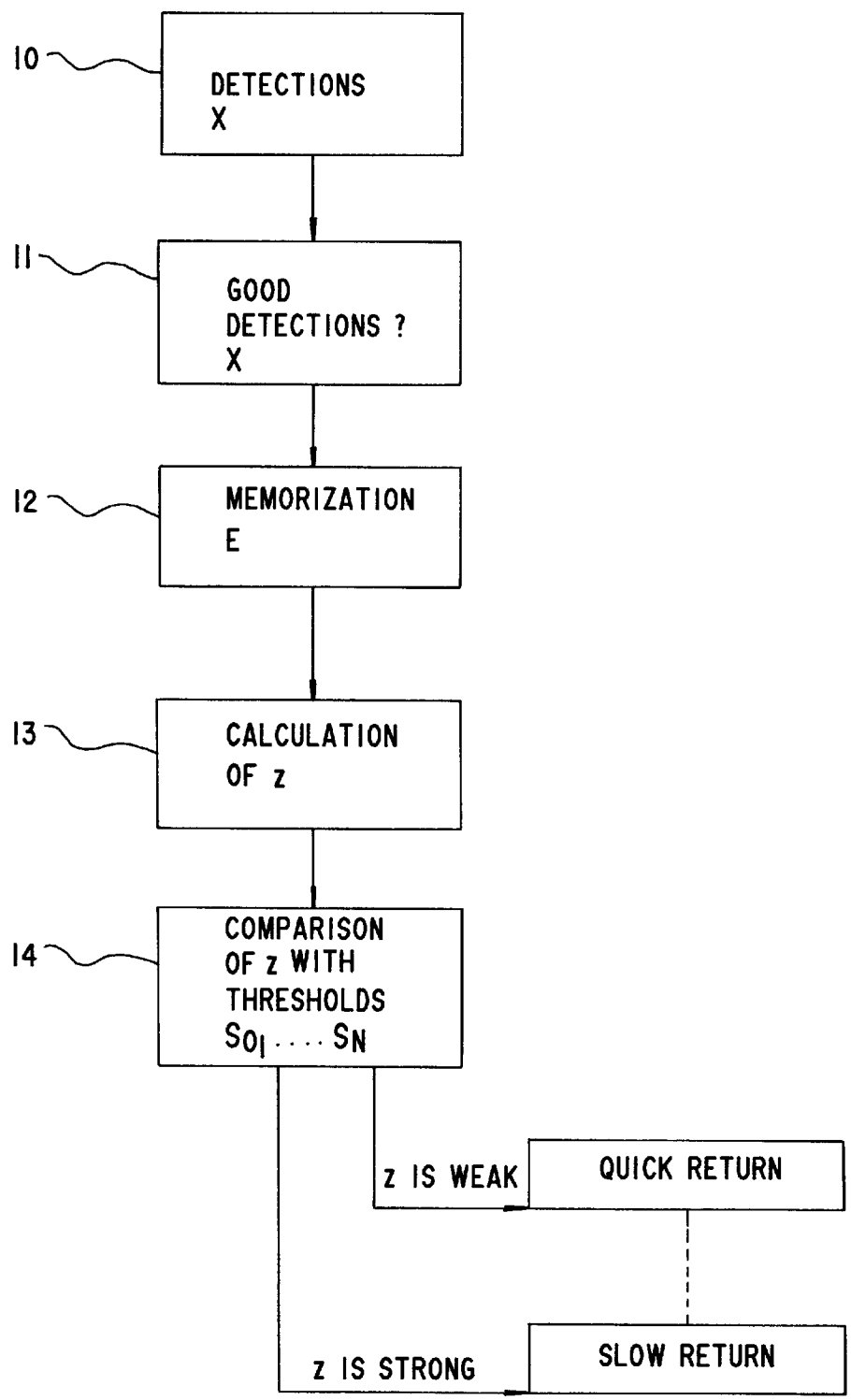

United States Patent

Rouphael

Patent Number: 5,806,489
Date of Patent: Sep. 15, 1998

[54] METHOD FOR RETURNING TO NOMINAL ADVANCE WHEN NO PINGING IS DETECTED

[75] Inventor: Roger Rouphael, L'Union, France

[73] Assignee: Siemens Automotive S.A., Toulouse Cedex, France

[21] Appl. No.: 849,642

[22] PCT Filed: Nov. 15, 1995

[86] PCT No.: PCT/EP95/04497

§ 371 Date: May 23, 1997

§ 102(e) Date: May 23, 1997

[87] PCT Pub. No.: WO96/16269

PCT Pub. Date: May 30, 1996

[30] Foreign Application Priority Data

Nov. 23, 1994 [FR] France .................................. 94 14125

[51] Int. Cl.[6] .................................................. F02P 5/152
[52] U.S. Cl. ............................................................... 123/425
[58] Field of Search .................................. 123/425, 419, 123/423, 422, 417

[56] References Cited

U.S. PATENT DOCUMENTS

| | | | |
|---|---|---|---|
| 4,300,503 | 11/1981 | Deleris et al. .......................... | 123/425 |
| 4,347,820 | 9/1982 | Deleris .................................... | 123/417 |
| 4,527,524 | 7/1985 | Guipaud ................................... | 123/425 |
| 4,631,680 | 12/1986 | Korb et al. ........................... | 364/431.05 |
| 4,658,789 | 4/1987 | Morita ...................................... | 123/422 |

FOREIGN PATENT DOCUMENTS

| | | |
|---|---|---|
| 0087162A2 | 8/1983 | European Pat. Off. . |
| 3414976A1 | 10/1984 | Germany . |
| 2193255 | 3/1988 | United Kingdom . |

OTHER PUBLICATIONS

Japanse Patent Abstract No. 56–75965 (Sugiura), dated Jun. 23, 1981.
Japanese Patent Abstract No. 59–41666 (Suematsu et al.), dated Sep. 1, 1982.

*Primary Examiner*—Willis R. Wolfe
*Assistant Examiner*—Hieu T. Vo
*Attorney, Agent, or Firm*—Herbert L. Lerner; Laurence A. Greenberg

[57] ABSTRACT

The present invention relates to a method for returning to nominal advance. This method is put into practice in the context of a strategy of electronic control of an internal combustion engine when a phenomenon of pinging has been detected and a method of retarding the ignition advance has led to the disappearance of the pinging. According to the invention this method is one which consists in:

counting the number of correct detections (x) of pinging which took place during a given number of combustion cycles, determining, for each of the detections counted, what was the energy level (E) of the pinging and calculating the mean energy level corresponding to the counted number of detections, weighting the number of detections with the mean energy level, and comparing the weighted number of detections (z) with a set of empirically predetermined thresholds ($S_0$ to $S_n$) in order thereby to formulate a law governing return to nominal advance.

6 Claims, 3 Drawing Sheets

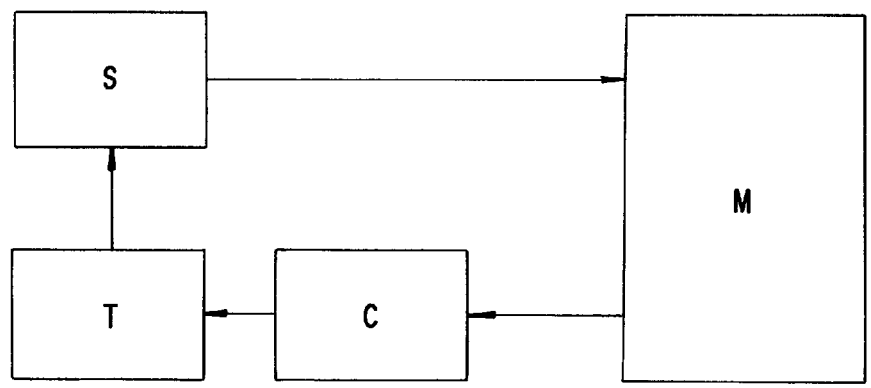
Fig.1
Fig.2a
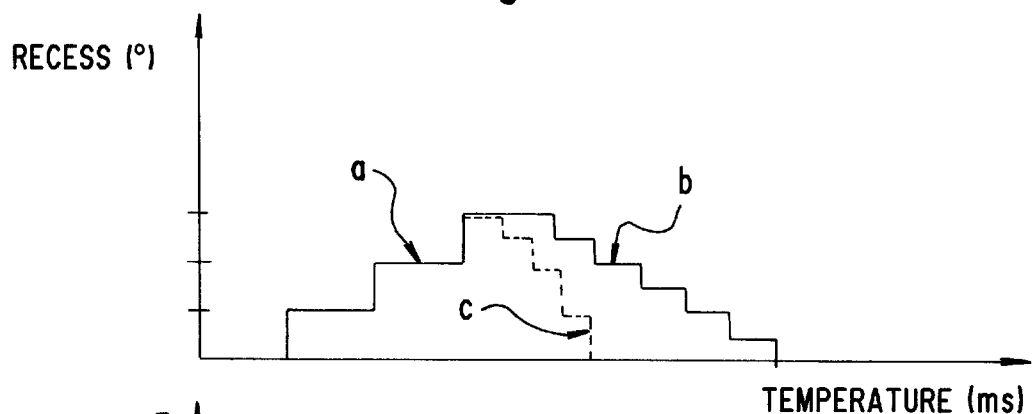
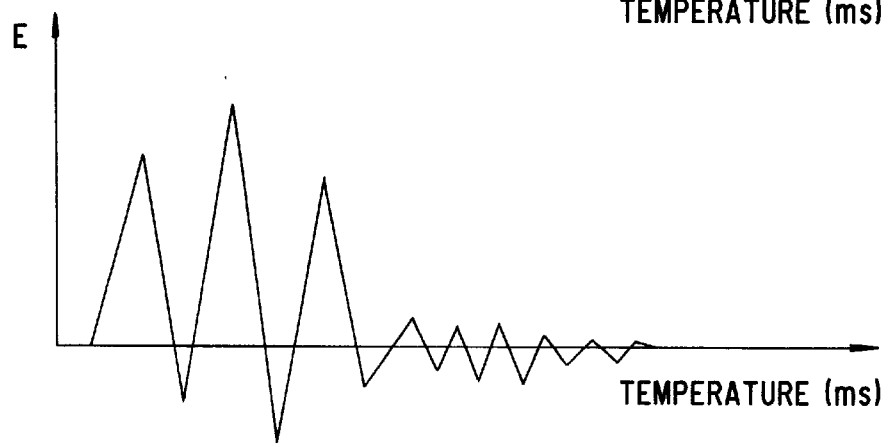
Fig.2b

METHOD FOR RETURNING TO NOMINAL ADVANCE WHEN NO PINGING IS DETECTED

The present invention relates to a method for returning to nominal advance if no pinging is detected.

The phenomenon known as "pinging" is well known. This is the self-ignition of the air/fuel mixture in the cylinder of an internal combustion engine before the ignition spark is produced. This abnormal combustion of the mixture gives rise to strong pressure waves and an acoustic noise called "pinging". When pinging is intense, it may lead to substantial damage to the engine, such as:

erosion of the cylinder head and of the pistons, broken piston top lands and piston rings, and the blowing of the cylinder head gasket or damage to the valves, for example.

To eliminate this phenomenon of pinging, known practice is to act especially on the ignition advance. By retarding the ignition advance the sparking plugs ignite earlier. This means that the combustion of the air/fuel mixture takes place a little earlier in the combustion cycle. If this combustion takes place early enough, then pinging can no longer occur.

Patent FR 2 689 183 (Siemens Automotive S.A.) relates to a method for retarding the ignition advance. In this patent, the law governing the retarding of the ignition advance takes into account not only the intensity of the pinging measured but also the history of this pinging for a given cylinder. Furthermore, the method according to this patent uses fuzzy logic to calculate the retard to be applied. Such a method makes it possible not to apply a fixed retard (which is penalizing to engine torque) but a retard which is proportional to the intensity of the pinging detected.

Of course, when retarding the ignition advance has made it possible to eliminate the pinging, the ignition needs to be set back to the nominal advance.

Strategies for returning to nominal advance, as shown, for example, in the document EP 0 087 162, recommend that return should be uniform and slow irrespective of the strength of pinging corrected. Now, for as long as an engine is not running at nominal advance, it is not producing its optimum torque. Furthermore, substantial corrections in advance are detrimental to engine stability.

The object of the present invention is therefore to look for a method for returning to nominal advance which allows the engine as quickly as possible to work in its optimum conditions, without, however, giving rise to further pinging.

For this purpose, the present invention relates to a method for returning to nominal advance, it being intended for said method to be put into practice in the context of a strategy of electronic control of an internal combustion engine when a phenomenon of pinging has been detected and a method of retarding the ignition advance has led to the disappearance of the pinging, said method according to the invention being one which consists in:

counting the number of detections of pinging which took place during a given number of combustion cycles, eliminating the false detections of pinging which are due to variations in speed and/or in air-inlet pressure, determining, for each of the detections counted, what was the energy level of the pinging and calculating the mean energy level corresponding to the counted number of detections, weighting the number of detections with the mean energy level, and comparing the weighted number of detections with a set of empirically predetermined thresholds in order thereby to formulate a law governing optimum return to nominal advance.

Thus the method according to the invention makes it possible to keep track of the intensity of the pinging previously corrected but also stores in memory the history of this pinging in order therefrom to deduce the optimum law governing return to nominal advance.

Advantageously, the number of detections of pinging is recorded by a simple counter and the return law to be followed is determined simply by comparing a weighted number of detections with a set of empirically predetermined thresholds.

According to a preferred embodiment of the invention, only detections of pinging carried out over the last four combustion cycles are taken into account.

Advantageously, only the "good detections" of pinging are taken into account. Effectively any "false pinging" due especially to a variation in engine speed or to a variation in air-inlet pressure is eliminated.

Figure 4A:
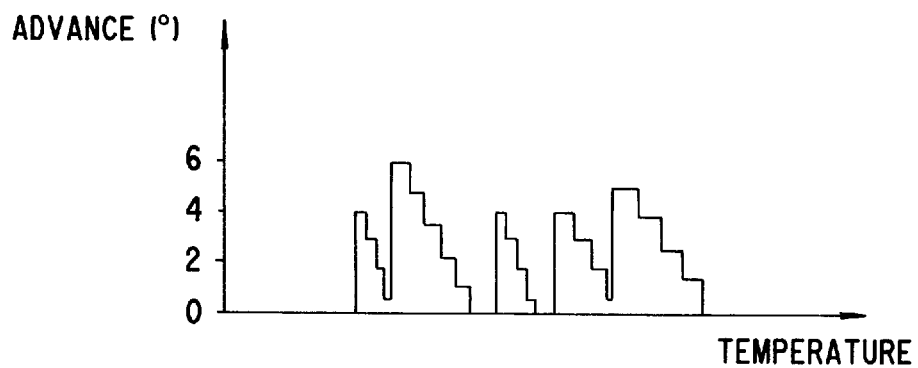
Figure 4B:
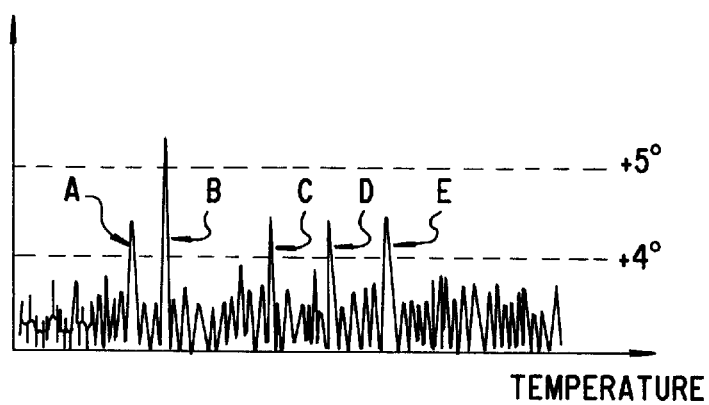

Further objectives, features and advantages will be better understood from reading the description which follows, by way of non-limiting example, and with reference to the attached drawings in which:

FIG. 1 is an operating diagram illustrating a conventional method of correcting the nominal advance, FIG. 2a illustrates a correction of ignition advance (curve a) followed by return to nominal advance of the conventional type (curve b) and by return to nominal advance according to the present invention (curve c), FIG. 2b shows in a way which corresponds with FIG. 2a, the shape of the signal picked up by the accelerometer in the pinging window, FIG. 3 is an operating diagram representing the various steps in the method according to the invention, FIG. 4a is a diagrammatic view illustrating the method of returning to nominal advance according to the invention, and FIG. 4b is a diagrammatic view showing, in a way which corresponds with FIG. 4a, the output signal from the pinging sensor.

As shown in FIG. 1, a conventional device for retarding the ignition advance includes a pinging sensor C, of the accelerometer type for example, fixed to an engine M. This sensor is sensitive to the pinging which occurs in each cylinder of the engine and delivers a signal to a signal processing stage T. The processed signal is then delivered to means S of calculating the ignition advance correction strategy. These means correct (curve a, FIG. 2a) as a function of the calculated retard, the moment of ignition of the sparking plug(s) placed in the cylinder(s) where the pinging was detected. When the pinging has disappeared, the calculation means S allow the ignition advance to return to its nominal value (curve b, FIG. 2a).

This return takes place, for example, continuously moving closer by 1° about every 2.5 seconds. Other corrections, always of a linear type, may be envisaged for adapting the ignition to suit the dirtiness and aging of the engine, the loss of efficiency of the cooling circuit and/or the quality of the fuel.

FIG. 2b shows, in a way which corresponds to the corrections of ignition advance, the peaks of intensity of pinging energy.

According to the present invention, in order to allow the engine to run optimally, that is to say to allow it to work as close as possible to nominal advance, a non-linear law for returning to nominal advance is followed (curve c, FIG. 2a).

For this, (FIG. 3), when, following retarding of the nominal advance, pinging is no longer detected, the procedure is as follows:

step 10, the number X of detections of pinging made before this non-detection is counted. As a preference, this is restricted to the last four combustion cycles. Thus in the worst case there will be four detections of pinging, and in the best case, zero.

step 11, a check is carried out to ensure that the X detections counted are indeed "good" detections. For this, any detection which might be due to a variation in engine speed or any detection which might be due to a variation in air-inlet pressure is eliminated. To eliminate these "poor" detections, a map produced from a standard engine as a function of engine speed and inlet pressure is taken into account. This map shows, as a function of engine speed and inlet pressure, the regions in which "false pinging" occurs. The number of good detections of pinging is termed x.

step 12, for each good detection of pinging, x, the value of the energy E of the pinging detected is stored in memory.

step 13, the number of good detections x over four combustion cycles is weighted with the mean energy E of the pinging. Let this weighted number be z.

step 14, this weighted number of detections z is compared with a plurality of empirically determined thresholds (S0 to Sn). The higher the weighted number of detections z, the stronger the pinging is reckoned to be.

step 15, the law governing return to nominal advance is established as a function of the value of the weighted number of detections z. When pinging is reckoned to be strong, return to nominal advance will be slow, but when the pinging is reckoned to be weak, return to nominal advance will be quick. Of course there is a specific law governing the return to nominal advance for each intermediate value (onset of pinging, medium pinging, very strong pinging, etc.).

It will be noted that such a method takes into account not only the intensity of the pinging corrected (because the energy E of this pinging is taken into account (step 12)), but also its history (step 11) when determining the type of return to nominal advance to be applied. This history makes it possible for the method according to the invention to be given a memory effect (in the example represented, this memory effect applies to the last four detections of pinging).

According to the invention, the law governing return to nominal advance depends on the number of times pinging has been detected, and on the intensity of this pinging. It is therefore possible, by influencing a counter which stores the number of good detections x, to modify the law governing return to nominal advance. Thus when the mean energy of pinging decreases it is possible to accelerate the return to nominal advance by artificially decrementing the counter which stores the number of detections. In this way it is possible to obtain a return law according to curve c (FIG. 2*a*). This decrementing is allowed only once the advance has come back by 1°.

Thanks to such decrementing a quicker return to optimum running conditions is brought about artificially.

FIG. 4*b* shows a signal from a pinging sensor of a conventional type. This figure shows that five pinging peaks, A, B, C, D, E are detected. These peaks correspond to "good pinging".

It will be observed that peak A causes a medium retard in the ignition advance (of the order of 4°). The law governing return to nominal advance following this retard is quick, because no pinging peak was detected beforehand and because the intensity of the peak A is average.

The second peak detected, B, for its part has a strong intensity, and it therefore causes a good deal of retard. As it is already preceded by a pinging peak and as the intensity of the peak B is high, it causes a slow return to the nominal value. This return to the nominal value is a full return because no pinging peak is detected immediately after it. The engine can therefore run at its nominal value for a short time.

The third, fourth and fifth peaks C, D, E follow close after one another in a short space of time and are of medium intensity. The method according to the invention makes it possible, following the retards brought about by each of these peaks, to formulate laws governing return to the nominal value suited to each of these peaks.

Thus the law governing the return to nominal advance for the peak C is a quick law because the peak C is not immediately preceded by another detection peak and because the intensity of the pinging detected is average.

Peak D, although it has an intensity similar to that of peak C, is immediately preceded by the peak C. In this case, the law governing the return to nominal advance is not quite as quick as the one following peak C. This is normal because the law governing return to nominal advance takes into account not only the intensity of the pinging peak detected but also the number of good pingings detected previously. The example represented is restricted to the last four combustion cycles.

Peak E for its part generates a very slow law governing return to nominal advance, not because of the intensity of the pinging detected (this intensity is actually similar to that of the two peaks C and D), but on account of the fact that it is immediately preceded by two good detections of pinging. The law governing the return to nominal advance here is due to the memory effect taken into account by the method according to the invention.

The example illustrated in FIGS. 4*a* and 4*b* shows that the laws governing return to nominal advance which are generated from the method according to the invention take into account not only the intensity of any "good pinging" detected, but also the history (memory effect) of the pinging detected. The engine therefore runs at nominal advance more often than in the conventional return methods which as a matter of course apply a slow return to nominal advance. Thus the method according to the invention makes it possible to improve the engine performance.

Of course the present invention is not limited to the embodiment previously described and it encompasses any alternative forms which are within the competence of those skilled in the art. In particular it is possible to take into account parameters other than the air-inlet pressure and the engine speed when determining whether or not a detection of pinging is to be considered as good. Likewise, the number of detections of pinging may be established over any number of combustion cycles, not just over four as previously described.

I claim:

1. In an electronic control of an internal combustion engine, where an ignition advance is retarded upon detecting a pinging event in the engine, a method for returning to nominal ignition advance after the pinging event has been corrected, the method which comprises:

counting a number of detections of pinging events during a given number of combustion cycles, and eliminating false detections of pinging events;

determining, for each detection in the counting step, an energy level of the respective pinging event, and calculating a mean energy level corresponding to a number of detections counted;

weighting the number of detections with the mean energy level;

comparing the weighted number of detections with a set of empirically predetermined thresholds, and formulating a return rule governing return to the nominal advance; and returning the ignition angle of the internal combustion engine to the nominal advance in accordance with the return rule.

2. The method according to claim 1, which comprises returning to nominal advance more quickly when the weighted number is smaller.

3. The method according to claim 1, which comprises storing in memory corrections in nominal advance during preceding cycles for storing in the memory the energy level of each pinging event detected.

4. The method according to claim 3, wherein the storing step is performed over four engine cycles preceding a current engine cycle.

5. The method according to claim 4, which further comprises incrementing a counter counting the number of detections by one unit each time the nominal advance is corrected, and, when no correction is made to the nominal advance, decrementing the counter by one unit.

6. The method according to claim 5, which comprises actively decrementing the counter by one unit when the mean energy decreases and when the nominal advance has returned by at least 1°.

\* \* \* \* \*